United States Patent [19]
Maeda et al.

[11] Patent Number: 5,637,048
[45] Date of Patent: Jun. 10, 1997

[54] POWER TRAIN DEVICE

[75] Inventors: Hiroaki Maeda; Minoru Ikeda; Satomi Suzuki; Munenori Ota; Shinichiro Iwasaki, all of Aichi Pref., Japan

[73] Assignee: Aisin Seiki Kabushiki Kaisha, Kariya city, Japan

[21] Appl. No.: 429,097

[22] Filed: Apr. 26, 1995

[30] Foreign Application Priority Data

Apr. 27, 1994 [JP] Japan .................................. 6-090152
Jun. 30, 1994 [JP] Japan .................................. 6-150149

[51] Int. Cl.$^6$ .................................................. F16H 1/46
[52] U.S. Cl. ................................................ 475/150
[58] Field of Search ........................................... 475/150

[56] References Cited

U.S. PATENT DOCUMENTS 5,396,968  3/1995  Hasebe et al. ........................ 475/150

OTHER PUBLICATIONS

*Symposium Proceedings,* The 11th International Electric Vehicle Symposium, Second Volume, Sessions 10–20, Sep. 27–30, 1992, pp. 1–8.

*Primary Examiner*—Dirk Wright
*Attorney, Agent, or Firm*—Burns, Doane, Swecker & Mathis, LLP

[57] ABSTRACT

A power train device is provided with an electric motor including a cylindrical stator wound with electric oils and a cylindrical rotor which is disposed radially inwardly of the stator and rotated by energization of the electric coils. A reduction gear mechanism is provided for reducing the number of rotations of the rotor, and a differential gear mechanism is provided for supplying rotation power from the output of the reduction gear mechanism to a pair of drive shafts connected to each wheel and for absorbing a differential between the wheels. A cover covers the electric motor, the reduction gear mechanism and the differential gear mechanism, and the reduction gear mechanism is mounted radially inwardly of the cylindrical rotor.

12 Claims, 13 Drawing Sheets

POWER TRAIN DEVICE

BACKGROUND OF THE INVENTION

The present invention relates to a power train device, and in particular to a power train device to be used for an electric vehicle or other type device which is driven by an electric motor, a reduction gear mechanism and a differential gear mechanism.

A conventional power train device is disclosed in FIG. 3 at page 8 of Second Volume Sections 10–20 of SYMPOSIUM PROCEEDINGS which is published by FORD MOTOR Co., at international EV symposium held in Sep. 27–30, 1992. The conventional device as shown in FIG. 9 has an electric motor 1, a reduction gear mechanism 2, a differential gear mechanism 3, an input shaft 4 cooperating with the output side (rotor) of the electric motor 1, an output shaft 5 cooperating with the input side (deferential case) of the differential gear mechanism 3, and a pair of drive shafts 6 and 7 cooperating with the output side (side gear) the differential gear mechanism 3. The input shaft 4 and the output shaft 5 are positioned coaxially around the drive shafts 6 and 7. The input shaft 4 and the output shaft 5 cooperate with each other via the reduction gear mechanism 2. The electric motor 1 is positioned in series with one side of the reduction gear mechanism 2 in the axial direction. The differential gear mechanism 3 is positioned in series with the other side of the reduction gear mechanism 2 in the axial direction.

However, in the conventional power train device, the electric motor 1 and the differential gear mechanism 3 are positioned in series with the reduction gear mechanism 2 in the axial direction, so that the space required for positioning the electric motor 1, the differential gear mechanism 3 and the reduction gear mechanism 2 becomes larger in the axial direction. When the conventional power train device is installed in a vehicle, as shown in FIG. 10c, there are several adverse effects to the vehicle, such as the joint angle of the drive shafts 6 and 7 becomes large, the conventional power train device is interferes with a chassis frame of the vehicle, etc.

Further, there is another conventional power train device disclosed in FIG. 11. This conventional power train device has an electric motor 1, two reduction gear mechanisms 2, a differential gear mechanism 3, and a pair of drive shafts 6 and 7. The output of the electric motor is supplied to the differential gear mechanism 3 and the two outputs of the differential gear mechanism 3 are conveyed to the drive shafts 6 and 7 via the two reduction gear mechanisms 2 respectively. In this conventional power train device, two reduction gear mechanisms are necessary which requires more space for accommodating the power train device.

SUMMARY OF THE INVENTION

It is, therefore, a primary object of the present invention to provide a power train device which can reduce the space required for positioning the electric motor 1, the differential gear mechanism 3 and the reduction gear mechanism 2 in the axial direction of the power train device.

BRIEF DESCRIPTION OF THE DRAWINGS

The above and other objects, features and advantages of the present invention will be more apparent and more readily appreciated from the following detailed description of preferred exemplary embodiment of the present invention, taken in connection with the accompanying drawings, in which.

DESCRIPTION OF THE PREFERRED EMBODIMENTS

Figure 1:
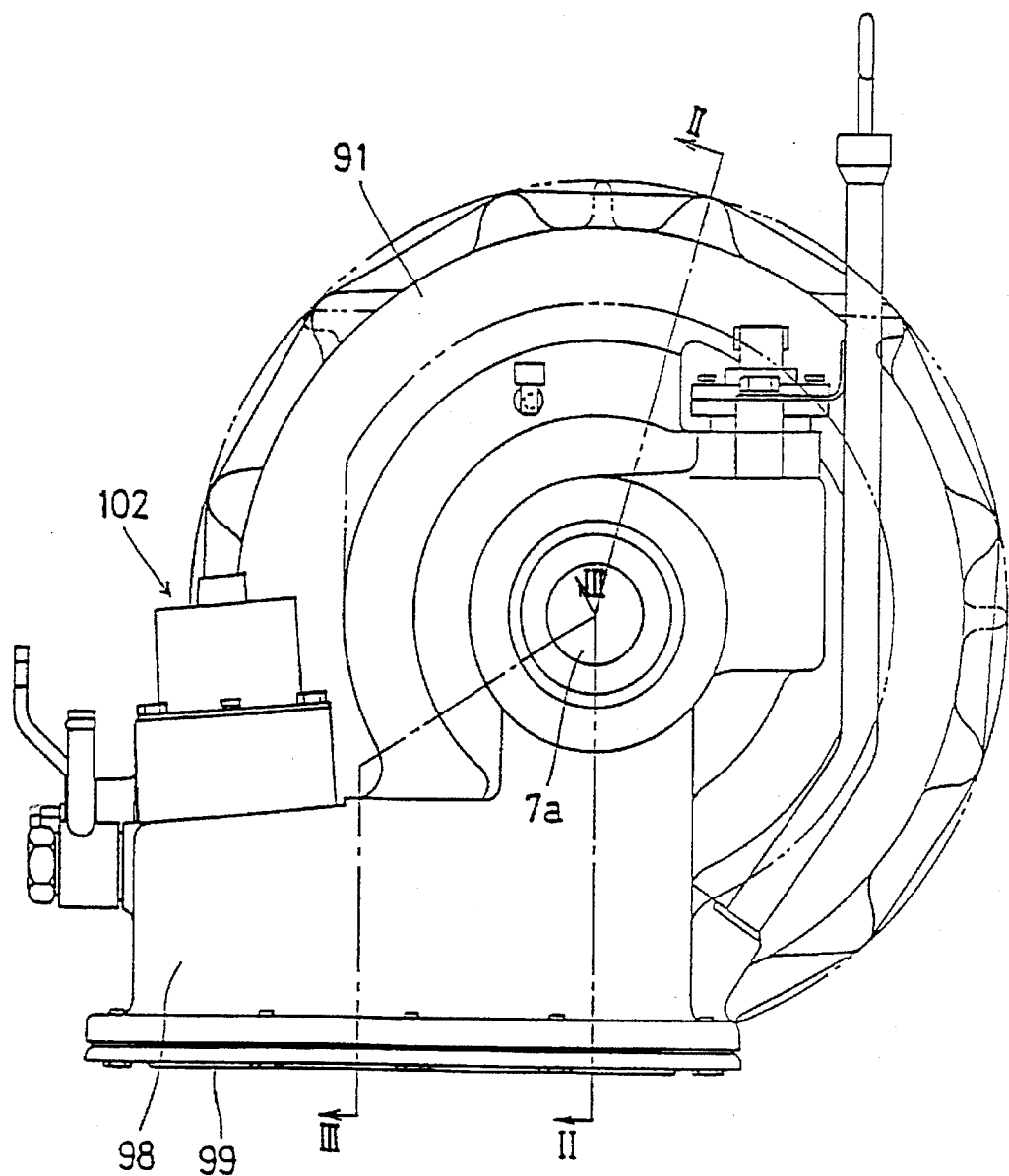
FIG. 1 is an elevational view of a power train device of a first embodiment according to the present invention.

Embodiments of the present invention will be described hereinunder in detail with reference to the accompanying drawings.

FIRST EMBODIMENT

A first embodiment of a power train device for a vehicle according to the present invention is shown in FIGS. 1 to 5 and FIG. 10a. A high rotation and low torque electric motor 1 is used for this first embodiment. The power train device includes the electric motor 1, a reduction gear mechanism 2, a differential gear mechanism 3, a rotatable input shaft 4, a rotatable output shaft 5, a pair of drive shafts 6 and 7, a case 9, and a parking mechanism 101.

Figure 10A:
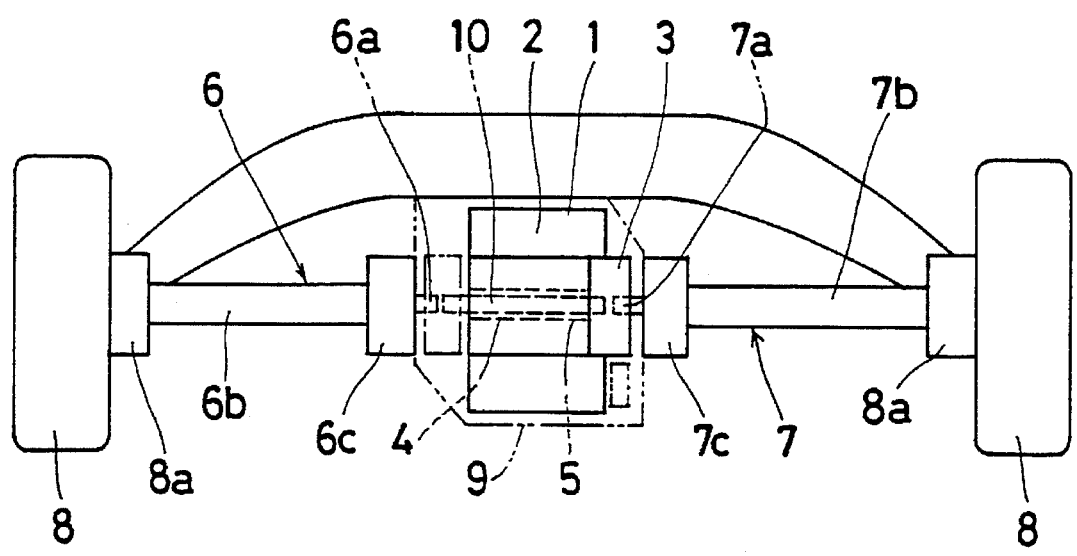
FIG. 10a, 10b and 10c are a schematic presentation showing examples of arrangement of the first, and second embodiments according to the present invention and the conventional power train device for vehicle respectively.

The drive shafts 6 and 7 are disposed coaxially in series in the axial direction. The drive shafts 6 and 7 include input side shafts 6a and 7a respectively which are disposed at the inner side of the vehicle. The input side shaft 6a is rotatably fixed to a medium shaft 10 a medium portion 10b. As shown in FIG. 10a, the drive shafts 6 and 7 further include joints 6c and 7c and output side shafts 6b and 7b. The joints 6c and 7c unite the rotation between the input side shafts 6a and 7a and the output side shafts 6b and 7b. The output side shafts 6b and 7b connect a pair of wheels 8 via joints 8a.

The case 9 includes six portions 9a, 9b, 9c, 9d, 9f and 9g.

The portion 9a is of cylindrical shape and one end of the portion 9a is fixed to the portions 9b and 9f by bolts. The electric motor the reduction gear mechanism 2 and the differential gear mechanism 3 are housed in a space enclosed by the portions 9a and 9b to provide an outer portion 91. The portion 9a rotatably supports one end 5a of the output shaft 5 via a bearing 95. The portion 9b rotatably supports a connective portion 15 via a bearing 93. The connective portion 15 is fixed on the input shaft 4 by a spline connection so that the connective portion 15 may rotate with the input shaft 4. Accordingly, the input shaft 4 and the output shaft 5 are rotatably housed in the case 9. The input shaft 4 and the medium shaft 10 extend from the inside to the outside of the outer portion 91. The collar 10a is disposed between an inner hole of the portion 9f and the medium portion 10b which is fixed to the input side shaft 6a and the medium shaft 10. Accordingly, the input side shaft 6a and the medium shaft 10 are rotatably housed in the case 9.

The portion 9c is fixed by bolts to the portion 9a in the outer portion 91 and the portion 9c and the portion 9a form a space B therein for accommodating the differential gear mechanism 3. The portion 9d is fixed by bolts to the portion 9c. The portions 9b and 9c rotatably support the outside of the output shaft 5 via a bearing 94. Accordingly, the output shaft 5 is rotatably housed in the case 9. A ring gear 2a and a bearing 96 are fixed by a snap ring to the portion 9d. The bearing 96 is connected to a cylindrical output shaft 13 of the electric motor 1. The ring gear 2a covers the outside of the reduction gear mechanism
2. The space enclosed by the outside of the portions 9c, 9d and the ring gear 2a and the inside of the portions 9a, 9b is designated by "A". The electric motor 1 is disposed in the space A. The portions 9c, 9d and the ring gear 2a form a part 92 which extends in the axial direction in FIG. 2.

The portion 9g is fixed by bolts to a cover portion 98 which is formed under the portion 9a in a body. The portion 9g, inside of the cover portion 98 and under side of the portion 9a form a space D.

The electric motor 1 is a switched reluctance type and a brush-less type. The electric motor 1 includes a cylindrical stator 11 and a cylindrical rotor 12. The rotor 12 has the cylindrical output shaft 13. The cylindrical output shaft 13 has a rotary sensor 14. The stator 11 is fixed to the inner side of the outer portion 91. The cylindrical output shaft 13 is fixed to the connective portion 15 by a snap ring. Accordingly, the rotor 12, the cylindrical output shaft 13, the rotary sensor 14 and the connective portion 15 are rotatably housed in the case 9 together with the input shaft 4. The stator 11 includes electric coils. Several fins are formed on the outside of the case 9 for radiating heat from the stator 11. The cylindrical output shaft 13 is disposed around the part 92. The rotor 12 has several teeth on the outside thereof. When the electric coils of the stator 11 are turned on or off selectively supply electric current, the rotor 12 is rotated together with the input shaft 4.

The reduction gear mechanism 2 uses a planetary gear set without a shift change mechanism. The reduction gear mechanism 2 includes two gear sets 21 and 22. The first gear set 21 includes the ring gear 2a, two pinion gears 21a and 21b, two pins 21c and 21d, and a carrier 21e. The second gear set 22 includes the ring gear 2a, two pinion gears 22a and 22b, two pins 22c and 22d, and a carrier 22e. The pinions 21a, 21b, 22a and 22b are supported around the pins 21c, 21d, 22c and 22d respectively by plates 21f and 22f. The ring gear 2a acts in common with the gear sets 21 and 22. The input shaft 4 acts as a sun gear of the first gear set 21. The carrier 21e acts as a sun gear of the second gear set 22. The carrier 22e is fixed to the output shaft 5 by a spline connection. Rotation of the input shaft 4 is transmitted to the output shaft 5 via two gear sets 21 and 22 so that the number of rotations of the output shaft 5 is reduced as compared with the number of the rotations of the input shaft 4. Because the reduction gear mechanism 2 is formed by two parallel gear sets 21 and 22, the required torque for the vehicle is available without enlarging the space for the power train device in the radial direction.

The differential gear mechanism 3 is a bevel gear box type. The differential gear mechanism 3 includes a differential case 31, a pair of pinion gears 32 and 33, and a pair of side gears 34 and 35. The differential case 31 is formed on the output shaft 5 in a body. The differential case 31 accommodates the pinion gears 32 and 33 and side gears 34 and 35 therein. The side gears 34 and 35 are fixed by a spline connection to the medium shaft 10 and the input side shaft 7a, respectively. The pinion gears 32 and 33 are supported by a pin 36 to be rotatable against the differential case 31. The pinion gears 32 and 33 gear with the side gears 34 and 35.

As shown in FIGS. 2 to 5, the parking mechanism 101 includes a lock gear 101a, a lock cam 101b, a detent lever 101c, a lock pole 101d, and a lock rod 101e. The lock gear 101a is disposed in the space C. The lock gear 101a is fixed by a spline connection to the input shaft 4. The lock cam 101b includes a cylindrical cam 101b1 and a movable part 101b2. The cam 101b1 has a cam face inside thereof and is fixed to the case 9 in a space E formed by the portions 9a, 9b and 9f. The movable part 101b2 is supported in the cam 101b1 along the cam face of the cam 101b1 so that the movable part 101b2 is moved in the radial direction when the movable part 101b2 moves in the axial direction. The detent lever 101c is rotatably disposed against the case 9 in the space D. The detent lever 101c is connected with a parking lever (not shown) of the vehicle. The lock pole 101d is disposed between the movable part 101b2 and the lock gear 101a in the space C. When the movable part 101b2 moves toward the inside of radial direction, the lock pole 101d engages with a tooth of the lock gear 101a so that the rotation of the lock gear 101a is stopped. The lock rod 101e is disposed between the movable part 101b2 and the detent lever 101c. When the detent lever 101c rotates, the movable part 101b2 is moved in tile axial direction by the lock rod 101e.

Figure 3:
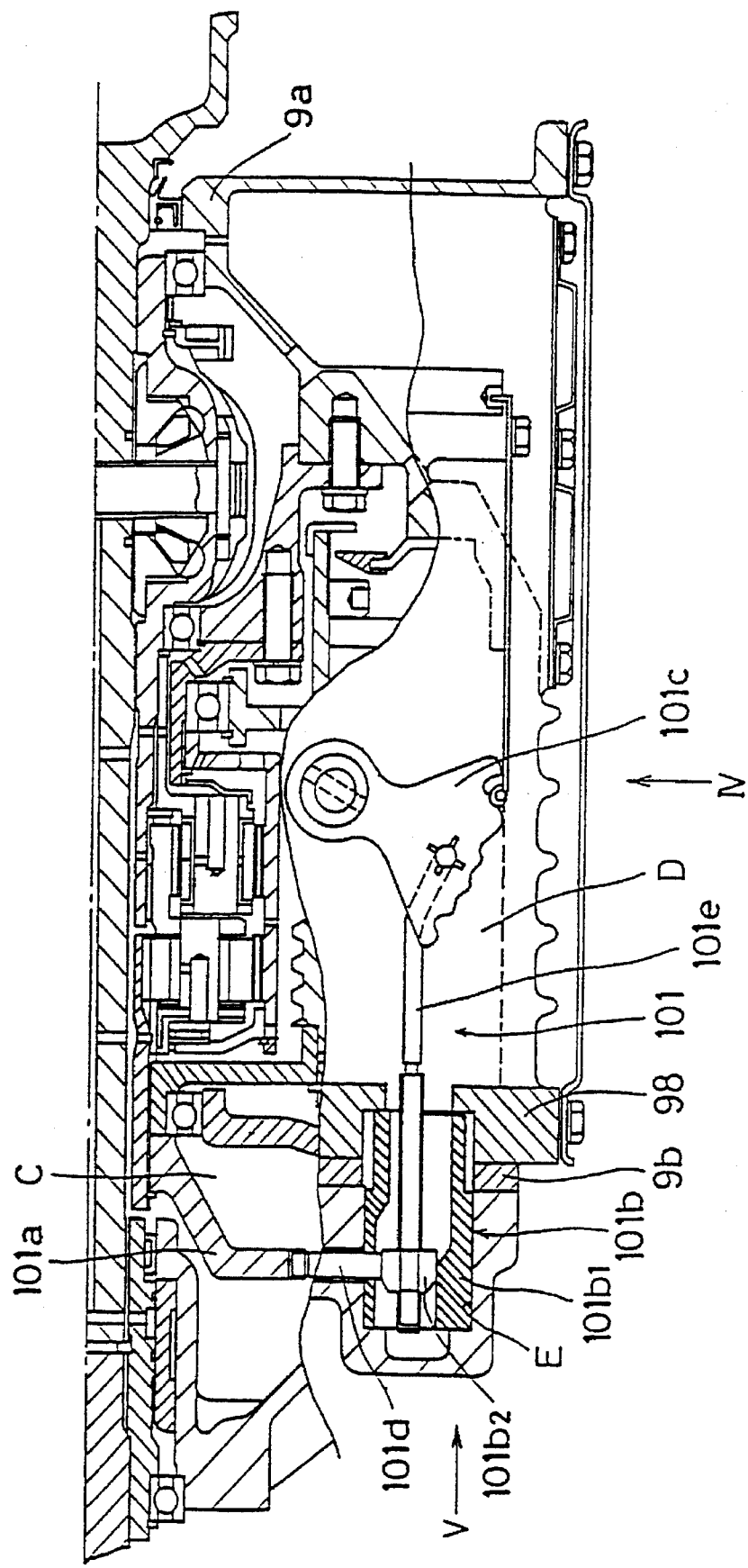
FIG. 3 is a cross-sectional view taken on line G—G of FIG. 1.
Figure 4:
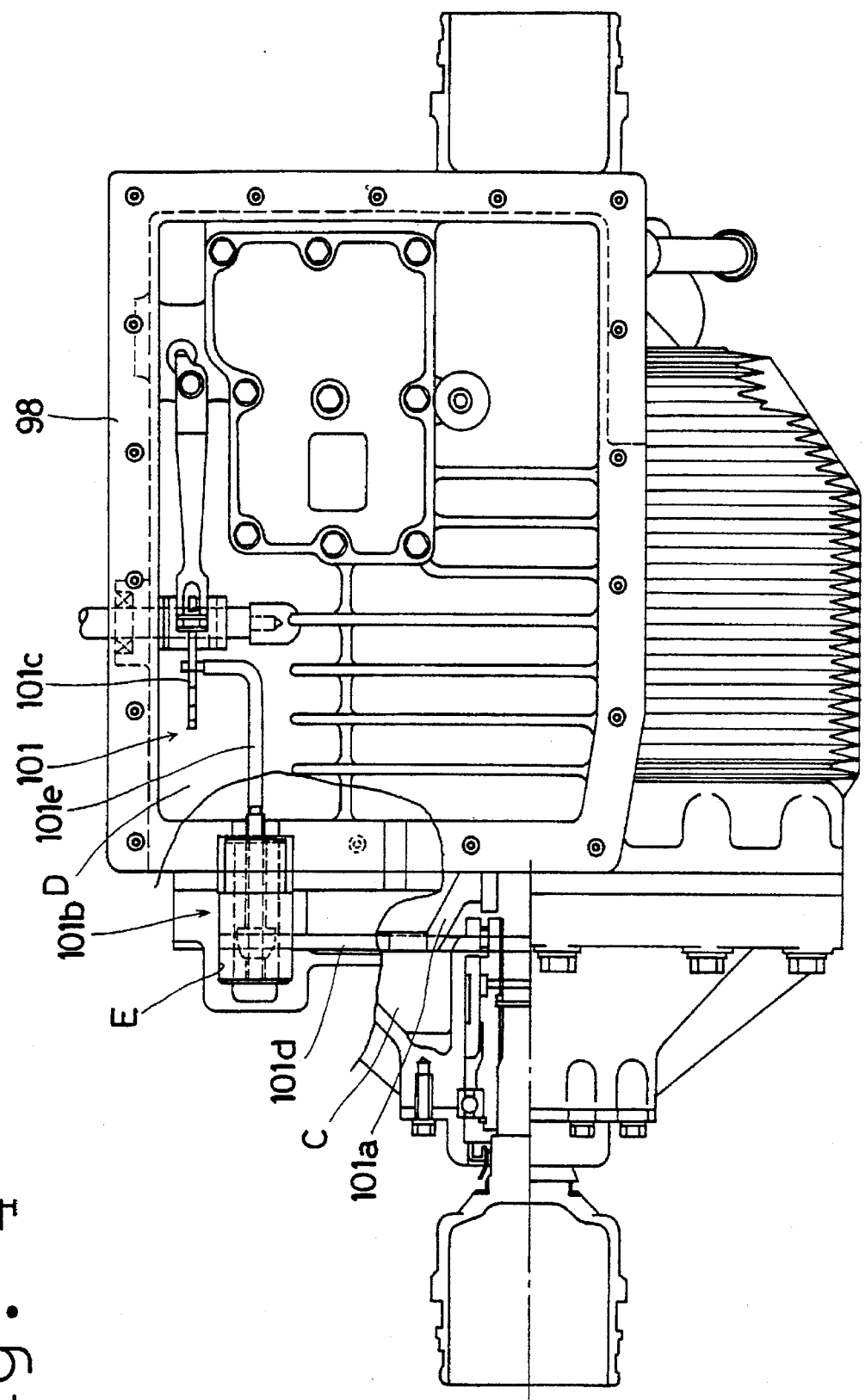
FIG. 4 is a perspective cross-sectional view taken in the direction of the arrow H of FIG. 3.
Figure 5:
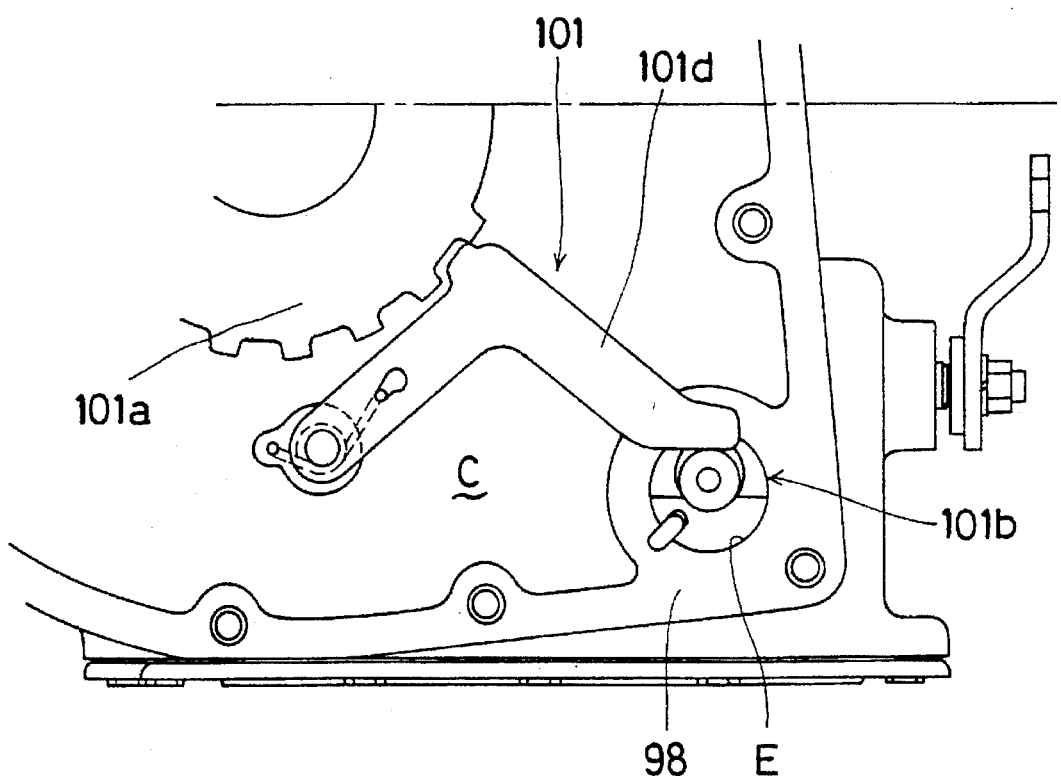
FIG. 5 is a perspective cross-sectional view taken in the direction of the arrow I of FIG. 3.

In FIG. 3, when the parking lever is operated by a driver of the vehicle, the detent lever 101c is rotated in clock wise direction, the lock rod 101e is moved in the left direction, the movable part 101b2 is moved in the upper direction, and the lock pole 101d engages with the tooth of the lock gear 101a so that the rotation of the lock gear 101a is stopped. Accordingly, the input shaft 4 is locked and the wheels of the vehicle are locked. In this embodiment, the parking mechanism 101 is disposed in the spaces C and D so that a length of an axis between each side of the wheels of the vehicle.

Figure 2:
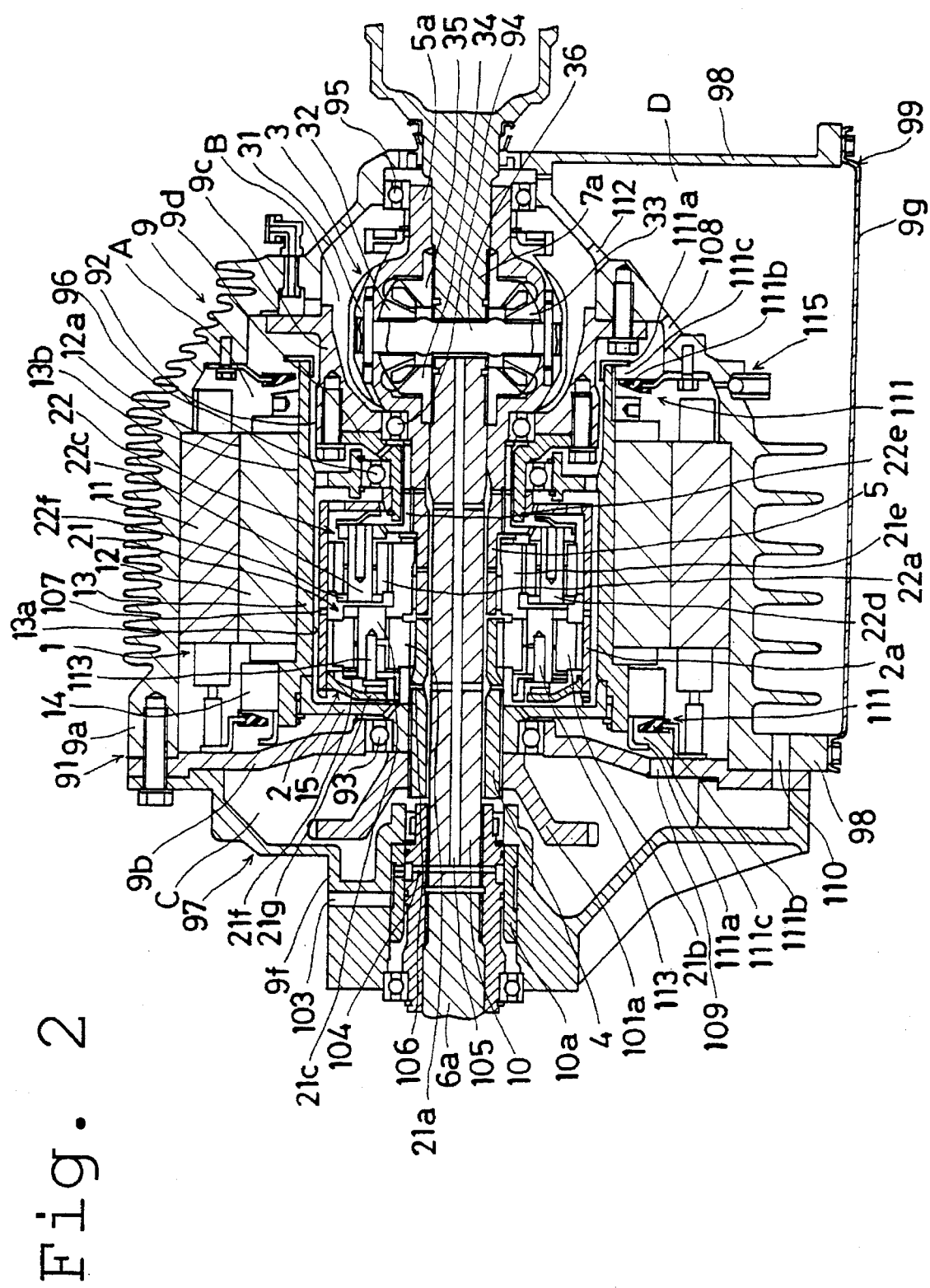
FIG. 2 is a cross-sectional view taken on line F—F of FIG. 1.

As shown in FIG. 2, a lubricating oil is accumulated in the space D for lubricating engaging parts and rotating parts. The lubricating oil is drawn up to supply hole 103 formed on the portion 9f via pipe (not shown) by an oil pump 102 (as shown in FIG. 1). The supply hole 103 is connected to a dispersion supply path 105 formed in the medium shaft 10 via a through hole 104 formed on the collar 10a and the medium portion 10b. The dispersion supply path 105 is connected to through holes 106 formed on the input shaft 4, output shaft 5, etc. The lubricating oil flows from the dispersion supply path 105 in a radial direction via the through hole 106 by the pressure of the oil pump and centrifugal force and is supplied to parts of the reduction gear mechanism 2 and parts around thereof for lubricating.

The lubricating oil passed to the reduction gear mechanism 2 flows into through holes 107 formed on the ring gear 2a and is further conveyed through the inner surface 13a of the cylindrical output shaft 13 so that the temperature inside of the electric motor 1 is cooled. Further, the lubricating oil flows to the space A and to the space D via a plurality of drain holes 108, 109 and 110 and a check valve 115 formed on the case 9. Labyrinth portions 111 are formed around the electric motor 1 so that the amount of the lubricating oil passed in the electric motor 1 to the check valve 115 is reduced compared with the amount of the oil through the drain holes 108,109 and 110. The labyrinth portions 111 include a plurality of plates 111a and a plurality of elastic portions 111b. The plates 111a are fixed on the outer surface 13b of the cylindrical output shaft 13. The elastic portions 111b are fixed on the portions 9a and 9b. The elastic portions 111b are formed not to connect the outer surface 13b and overlap the plates 111a in the radial direction. Labyrinths 111c are formed at the inner side of the outer surface 12a of the rotor 12 by the plates 111a and the elastic portion 111b. A portion which is at the side of the electric motor i in the labyrinth portion 111 has elastic characteristics is to permit easy assemble when the rotor 12 is inserted inside of the stator 11. The elastic portions 111b are formed not to connect the outer surface 13b so that the rotation of the cylindrical output shaft 13 is not prevented by the labyrinth portions 111 and the number of limitation of the high rotation of the electric motor 1 rises and the friction of the electric motor 1 reduced. Further, the labyrinths 111c are formed at the inner side from the outer surface 12a of the rotor 12 so that the amount of lubricating oil accumulated in the space D may be sufficiently maintained.

The lubricating oil through the differential gear mechanism 3 and parts around thereof passes the surface of the portions 9a and 9c and is drained to the space D via a hole 112 by centrifugal force. The lubricating oil through the parking mechanism 101 and parts around thereof pass the surface of the portions 9b and 9f and is drained to the space D via a hole 110 by centrifugal force. In this way, the space D functions as an oil pan and the lubricating oil accumulated in the space A which includes the electric motor 1 is very little so that electric motor 1 may be protected from the oil.

The dispersed supply of the lubricating oil is carried out by the medium shaft 10 only. In addition the seals may be few and the construction of the oil path may be simplified.

Figure 6:
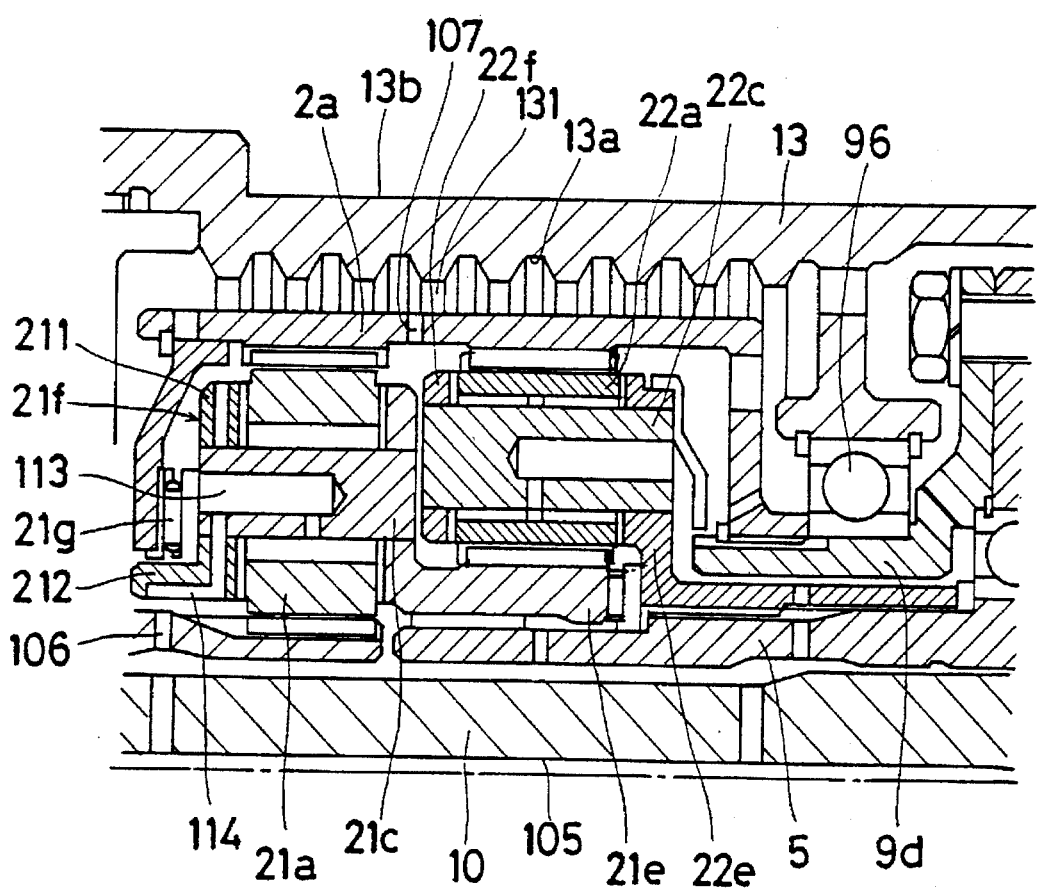
FIG. 6 is an enlarged fragmentary cross-sectional view of the power train device of FIG. 2.

The lubrication of the pinions 21a and 21b are done via passages 113 in the pins 21c and 21d. The passages 113 open toward the plates 21f. Conventionally, an oil receiver is needed for loading the oil to the passages 113 which extends from the inner side to the outer side in the radial direction, but there is a bearing 21g in position for placing the oil receiver. Accordingly, the reduction gear mechanism 2 may become larger in the axial direction by the amount of the oil receiver. However, in this embodiment, as shown in FIG. 6, the plates 21f includes a radial direction extending part 211 and an axial direction extending part 212. The radial direction extending part 211 is fixed to the pin 21c and receives a bearing 21g. The axial direction extending part 212 extends from the inner side of the radial direction extending part 211 toward the hole 106. The plates 21f include a hole 114 which opens to the inner side against the hole 106 and connects to the passage 113. The bearing 21g is disposed at the outer side of the axial direction extending part 212. In this way, it is possible to dispose the bearing 21g and to lead the lubricating oil in the passage 113 without the space for setting the reduction gear mechanism 2 becoming large.

Further, in this embodiment, a spiral groove 131 is cut in the inner surface 13a of the cylindrical output shaft 13. Accordingly, when the cylindrical output shaft 13 rotates, the lubricating oil moves in the axial direction by the spiral groove 131 so that the lubricating oil is smoothly drained and the electric motor 1 is cooled well.

SECOND EMBODIMENT

Figure 8:
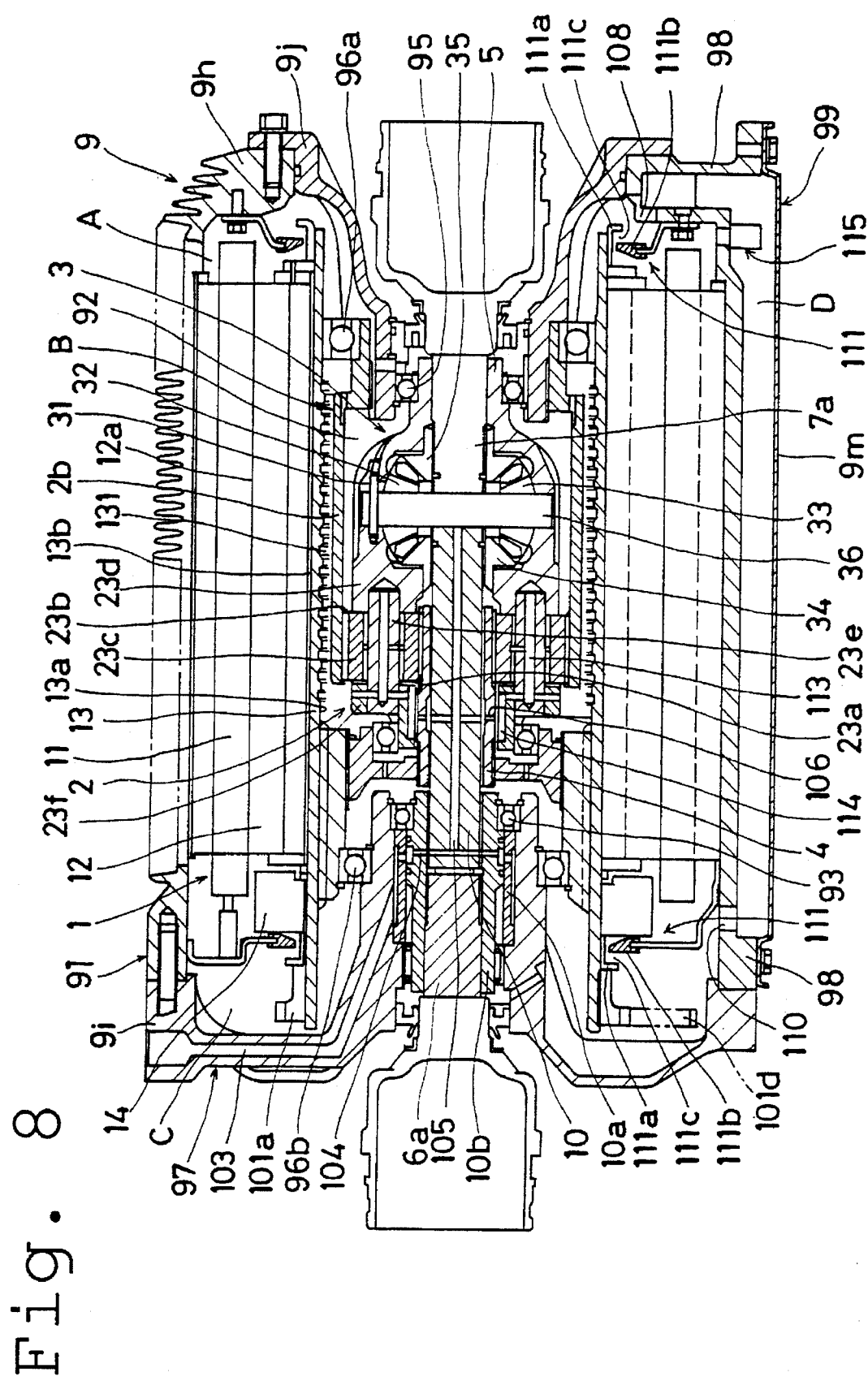
FIG. 8 is a cross-sectional view of a power train device of FIG. 2, showing a second embodiment according to the present invention.
Figure 9:
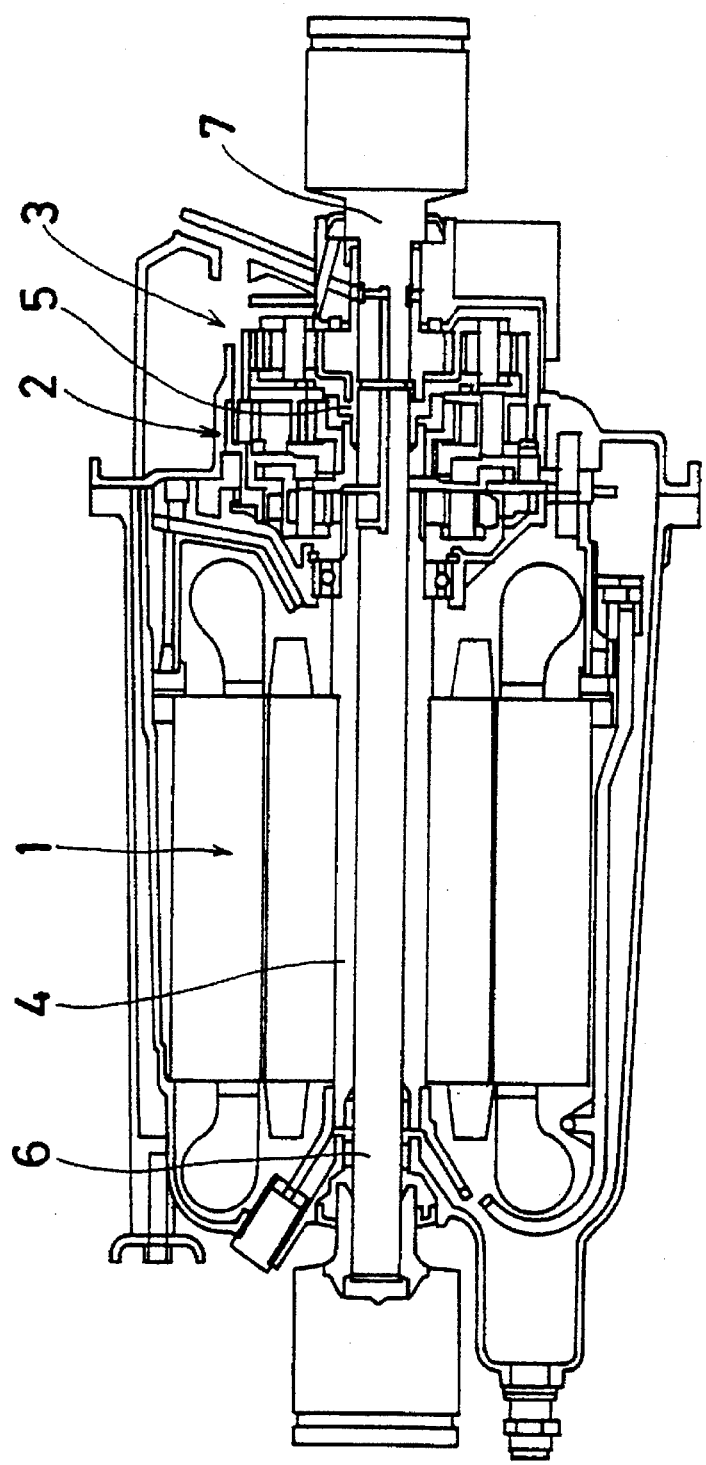
FIG. 9 is a cross-sectional view of a conventional power train device.
Figure 10B:
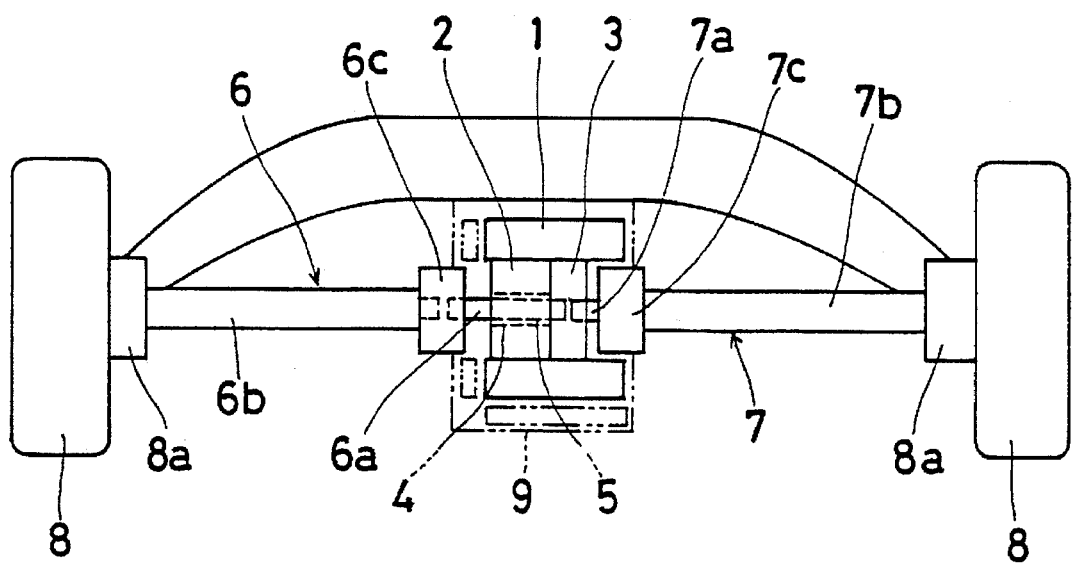
Figure 10C:
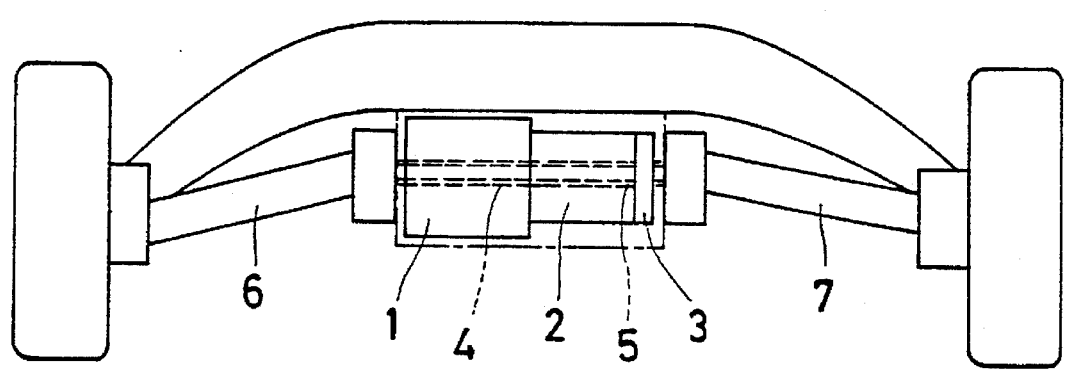
Figure 11:
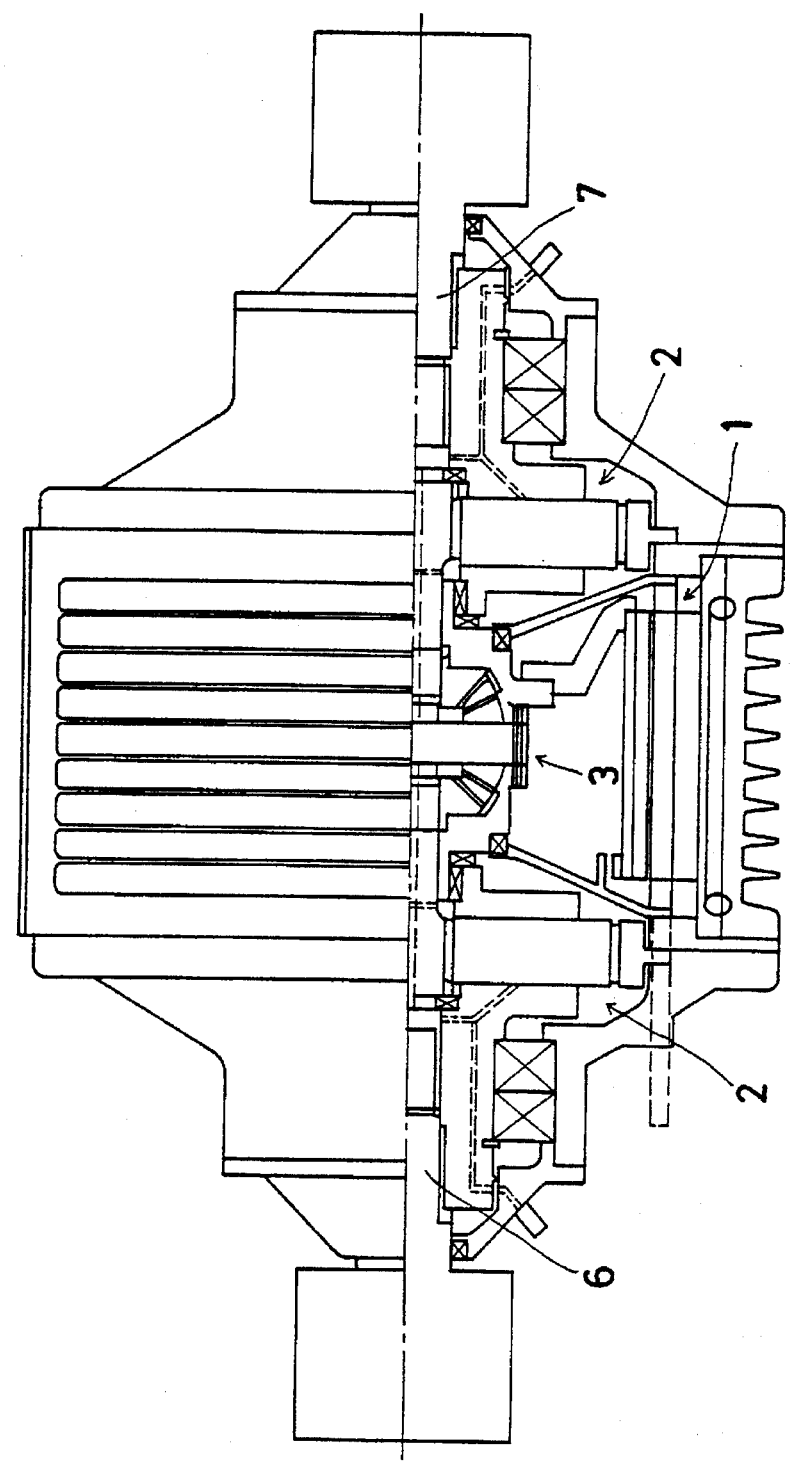
FIG. 11 is a cross-sectional view of another conventional power train device.

A second embodiment of a power train device for a vehicle according to the present invention is shown in FIGS. 8 and 10b. A low rotation and high torque electric motor 1 is used for this second embodiment. The power train device includes the electric motor 1, a reduction gear mechanism 2, a differential gear mechanism 3, a rotatable input shaft 4, a rotatable output shaft 5, a pair of drive shafts 6 and 7, a case 9, and a parking mechanism 101, in as the first embodiment.

The drive shafts 6 and 7 are disposed coaxially in series in the axial direction. The drive shafts 6 and 7 respectively include input side shafts 6a and 7a which are disposed at the inner sade of the vehicle. The input side shaft 6a is fixed rotatably to a medium shaft 10 via a medium portion 10b. As shown in FIG. 10b, further, the drive shafts 6 and 7 includes joints 6c and 7c and output side shafts 6b and 7b. The joints 6c and 7c unite the rotation between the input side shafts 6a and 7a and the output side shafts 6b and 7b. The output side shafts 6b and 7b connect the wheels 8 via joints 8a.

The case 9 includes five portions 9h, 9i, 9j, 9k and 9m.

The portion 9h is of cylindrical shape and each end of the portion 9h is fixed to the portions 9i and 9j by bolts. The electric motor 1, the reduction gear mechanism 2 and the differential gear mechanism 3 are disposed in a space enclosed by the portions 9h, 9i and 9j to provide an outer portion 91. The portion 9j rotatably supports the output shaft 5 via bearing 95. The portion 9i rotatably supports a medium portion 10b via bearing 93 and rotatably supports the input shaft 4 via bearing 96b. The portion 9i is forms a space C which accommodates one end of the electric motor 1. A collar 10a is disposed between the portion 9i and the medium portion 10b. The medium portion 10b fixed on the input side shaft 6a and a medium shaft 10. Accordingly, the input side shaft 6a, the medium shaft 10, the input shaft 4 and the output shaft 5 are rotatably housed in the case 9.

The portion 9m is fixed by bolts under a cover portion 98 which is formed under the portion 9h in a body. The portion 9m, the inside of the cover portion 98 and the under side of the portion 9h form a space D.

A ring gear 2b is fixed by a spline connection to the portion 9j in a body. The ring gear 2b rotatably supports a cylindrical output shaft 13 of the electric motor 1 via bearing 96a. The ring gear 2b encloses a space B for accommodating the reduction gear mechanism 2 and the differential gear mechanism 3. The ring gear 2b covers an outside of the reduction gear mechanism 2. The space enclosed by the outside of the ring gear 2b and the inside of the portions 9h, 9j is designated by "A". The electric motor 1 is disposed in the space A. The ring gear 2b forms a part 92 which extends in the axial direction in FIG. 8.

The portion 9i is a first cover portion 97. The portions 9m is a second cover portion 99.

The electric motor 1 is a switched reluctance type and a brush-less type the same as in the first embodiment. The electric motor 1 includes a cylindrical stator 11 and a cylindrical rotor 12. The rotor 12 has the cylindrical output shaft 13. The cylindrical output shaft 13 has a rotary sensor 14. The stator 11 is fixed to inner side of the outer portion 91. The rotor 12, the cylindrical output shaft 13 and the rotary sensor 14 are rotatably housed in the case 9 together with the input shaft 4. The stator 11 includes electric coils. Several fins are formed on the outside of the case 9 for radiating heat from the stator 11. The cylindrical output shaft 13 is disposed around the part 92. The rotor 12 has several teeth on the outside thereof. When the electric coils of the stator 11 are turned on or off with electric current, the rotor 12 is rotated together with the input shaft 4.

The reduction gear mechanism 2 uses a planetary gear set without a shift change mechanism. The reduction gear mechanism 2 includes one gear set 23. The gear set 23 includes the ring gear 2b, pinions 23c, pins 23e, and a carrier 23d. The pinions 23c are supported around the pins 23e respectively by plates 23f. The input shaft 4 acts as sun gear of the gear set 23. The carrier 23d is formed on one end of the output shaft 5. Rotation of the input shaft 4 is transmitted to the output shaft 5 via the gear set 23 so that the number of rotations of the output shaft 5 is reduced compared with the number of the rotations of the input shaft 4.

The differential gear mechanism 3 is a bevel gear box type the same as in the first embodiment. The differential gear mechanism 3 includes the output shaft 5 which acts as a differential case, a pair of pinion gears 32 and 33, and a pair of side gears 34 and 35. The output shaft 5 accommodates the pinion gears 32 and 33 and side gears 34 and 35 therein. The side gears 34 and 35 are fixed by a spline connection to the medium shaft 10 and the input side shaft 7a, respectively. The pinion gears 32 arid 33 are supported by a pin 36 to be rotatable against the output shaft 5.

The parking mechanism 101 includes a lock gear 101a, a lock pole 101d, etc. the same as in the first embodiment. The lock gear 101a is disposed in the space C. The lock gear 101a is fixed by a spline connection to the input shaft 4 in a body via the cylindrical output share 13. Other portions are the same as in the first embodiment.

A lubricating oil is accumulated in the space D for lubricating biting parts and rotating parts the same as in the first embodiment. The lubricating oil is draw up to supply hole 103 formed on the portion 9i via pipe (not shown) by an oil pump. The supply hole 103 connects to a dispersion supply path 105 formed in the medium shaft 10 via a through hole 104 formed on the collar 10a and the medium portion 10b. The dispersion supply path 105 is connected with through holes 106 formed on the input shaft 4. The lubricating oil flows from the dispersion supply path 105 in a radial direction via the through hole 106 by the pressure of the oil pump 102 and centrifugal force and is supplied to parts of the reduction gear mechanism 2 and parts around thereof which require for lubricating.

The lubricating oil passed to the reduction gear mechanism 2 is conveyed through inner surface 13a of the cylindrical output shaft 13 so that the temperature inside of the electric motor 1 is cooled. Further, the lubricating oil flows to the space A and the space D via a plurality of drain holes 108 and 110 and a check valve 115 formed on the case 9. Labyrinth portions 111 are formed around the electric motor 1 so that the amount of the lubricating oil passed in the electric motor 1 to the check valve 115 is reduced compared with the amount of the oil through the drain holes 108 and 110. The labyrinth portions 111 include a plurality of plates 111a and a plurality of elastic portions 111b. The plates 111a are fixed on the outer surface 13b of the cylindrical output shaft 13. The elastic portions 111b are fixed on the portions 9h. The elastic portions 111b are formed not to connect the outer surface 13b and overlap the plates 111a in the radial direction. Labyrinths 111c are formed at the inner side of the outer surface 12a of the rotor 12 by the plates 111a and the elastic portion 111b. A portion which at the side of the electric motor 1 in the labyrinth portion 111 has elastic characteristics is to permit easy when the rotor 12 is inserted inside of the stator 11. The elastic portions 111b are formed not to connect the outer surface 13b so that the rotation of the cylindrical output shaft 13 may not be prevented by the labyrinth portion 111. Further, the labyrinths 111c are at the inner side from the outer surface 12a of the rotor 12 so that the amount of the lubricating oil accumulated in the space D may be sufficiently maintained.

The lubricating oil through the differential gear mechanism 3 and parts around thereof passing the surface of the ring gear 2b is drained to the inner surface 13a by centrifugal force. The lubricating oil through the parking mechanism 101 and parts around thereof passes the surface of the portion 9i and is drained to the space D via a hole 110 by centrifugal force. In this way, the space D functions as an oil pan and the lubricating oil accumulated in the space A which includes the electric motor 1 is very little so that the electric motor 1 may be protected from the oil.

The dispersed supply of the lubricating oil is carried out by the medium shaft 10 only. Also, the seal are few and the construction of the oil path is simplified.

The plates 23f are the same construction as same as the plates 21f of the first embodiment. A spiral groove 131 is also formed in the shaft 13 the as same as the first embodiment.

In the first and second embodiments, the electric motor 1 is disposed around the reduction gear mechanism 2 (the first embodiment) or around the reduction gear mechanism 2 and the differential gear mechanism 3 (the second embodiment). Accordingly, the length of the power train device becomes shorter in the axial direction, so that the joint angle of the drive shafts 6 and 7 may become large. Also, it is possible to reduce intervention with the flame of the vehicle, and it is easy to set a suspension device.

When the electric motor 1 is disposed around the reduction gear mechanism 2 only in the first embodiment, the diameter of the stator 11 is greater than a length of the stator 11 so that a torque per unit weight may becomes large. Also, the total torque may increase or the device may be made small and light.

When the electric motor 1 is disposed around the reduction gear mechanism 2 and the differential gear mechanism 3 in the second embodiment, the case 9 can be made simple and can be made cheap. Further, the space D can be made large and it is possible to receive a lot of the lubricating oil.

Figure 7:
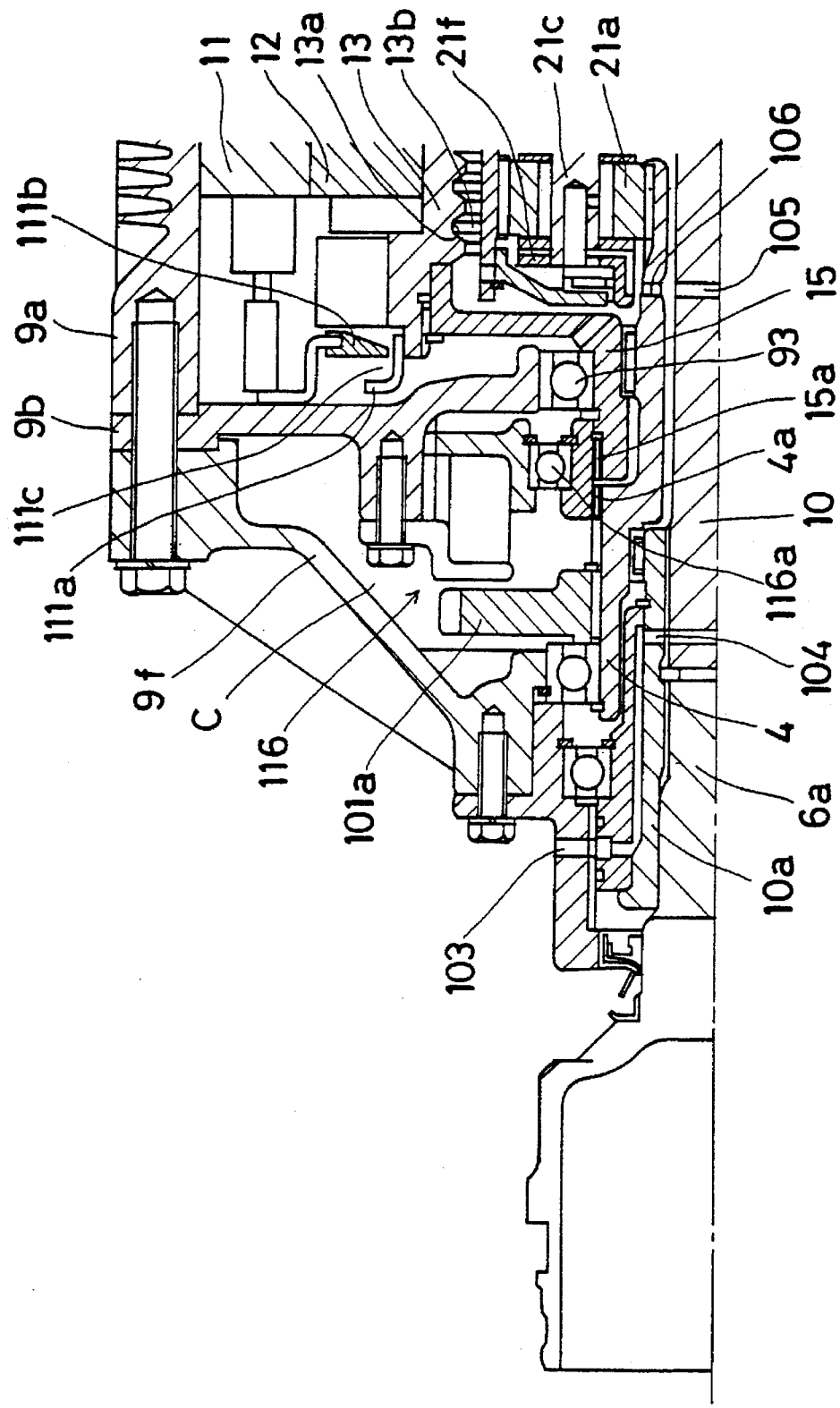
FIG. 7 is an enlarged fragmentary cross-sectional view of the power train device of FIG. 2, showing a various modification.

Further, in the first and second embodiments, the space C is spaced by the way that the reduction gear mechanism 2 is disposed inside of the electric motor 1. In this way, the power train device can be made small and the parking mechanism 101 and a drain pan is able to be set ideally. Particularly, in the first embodiment, the space D is formed using a slope of the case 9 which is made by the electric motor 1 and the differential gear mechanism 3. Further more, in the first embodiment, a neutral mechanism for providing safety against failure of the electric motor 1 is able be provided far to the vehicle. As shown in FIG. 7, a neutral mechanism 116 includes a release bearing 116a disposed between the connective portion is and the input haft 4. The release bearing 116a is fixed to a spline part 4a of the input shaft 4 and is able to move in the axial direction so that the release bearing 111a is connected or not to a spline part 15a of the connective portion 15. When the release bearing 116a is not connected to the spline part 15a of the connective portion 15, the rotation of the connective portion 15 is not transmitted to the input shaft 4.

In the first embodiment, the outer portion 91 of the case 9 supports the stator 11 and covers the differential gear mechanism 3 and the electric motor 1 disposed around the a reduction gear mechanism 2. The part 92 which extends in the axial direction supports the rotor 12, covers the reduction gear mechanism 2, and acts as an element which causes a reverse force against the reduction gear mechanism 2. Further, the part 92 forms the spaces A and B by cooperating with the outer portion 91. In, the second embodiment, the outer portion 91 of the case 9 supports the stator 11 and covers the electric motor 1 disposed around the reduction gear mechanism 2 and the differential gear mechanism 3.

The part 92 which extends in the axial direction supports the rotor 12, covers the reduction gear mechanism 2 and the differential gear mechanism 3, and acts as an element which causes a reverse force against the reduction gear mechanism 2. Further, the part 92 forms the space A by cooperating with the outer portion 91 and forms the space B. Therefore, the case 9 may become common by each elements. Also, the device is prevented from being large.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A power train device comprising:
    an electric motor including a cylindrical stator wound with electric coils and a cylindrical rotor disposed at an inner side of the stator and rotated by energization of the electric coils;
    a reduction gear mechanism for reducing the number of rotations of the rotor and for producing an output;
    a differential gear mechanism for supplying power from the output of the reduction gear mechanism to a pair of drive shafts connected to each wheel and for absorbing a differential between the wheels;
    a cover covering the electric motor, the reduction gear mechanism and the differential gear mechanism;
    wherein the reduction gear mechanism is mounted radially inwardly of the cylindrical rotor.

2. A power train device according to claim 1, wherein the differential gear mechanism is mounted radially inwardly of the cylindrical rotor.

3. A power train device according to claim 1 or claim 2, wherein at least one of the drive shafts is fixed to a medium shaft having one end connected to the differential gear mechanism, the drive shafts, the medium shaft and the differential gear mechanism being disposed in series, and the reduction gear mechanism being cylindrical and being disposed around the medium shaft.

4. A power train device according to claim 3, wherein the medium shaft has a dispersion supply path for dispersing a lubricating oil to the reduction gear mechanism and the differential gear mechanism, respectively.

5. A power train device according to claim 4, wherein electric motor includes labyrinth portions forming a labyrinth between an inside and an outside of the electric motor.

6. A power train device according to claim 5, wherein the labyrinth portions includes plates fixed on the rotor and an elastic portion fixed on the cover, the elastic portion overlapping the plates in the radial direction.

7. A power train device according to claim 4, wherein the cover has a space for functioning as an oil pan.

8. A power train device according to claim 7, wherein the cover has a check valve positioned between an inside of the electric motor and the oil pan.

9. A power train device according to claim 4, wherein the rotor has an outer side and a cylindrical output shaft at the outer side.

10. A power train device according to claim 9, wherein the cylindrical output shaft has an outer surface in which is formed a spiral groove.

11. A power train device according to claim 1 or claim 2, wherein the reduction gear mechanism includes a ring gear fixed to the cover, a sun gear fixed to the stator, a carrier connected to the differential gear mechanism, pins fixed to the carrier, and pinions disposed around the pins and gears between the ring gear and sun gear.

12. A power train device according to claim 1, wherein the cover forms a first space covering the electric motor, a second space covering the reduction gear mechanism and a third space covering the differential gear mechanism.

* * * * *